(12) United States Patent
Saito

(10) Patent No.: US 9,509,875 B2
(45) Date of Patent: Nov. 29, 2016

(54) IMAGE PROCESS DEVICE

(71) Applicant: Oki Data Corporation, Tokyo (JP)

(72) Inventor: Takashi Saito, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/689,854

(22) Filed: Apr. 17, 2015

(65) Prior Publication Data

US 2015/0312425 A1 Oct. 29, 2015

(30) Foreign Application Priority Data

Apr. 23, 2014 (JP) ................................. 2014-089311

(51) Int. Cl.
*H04N 1/04* (2006.01)
*H04N 1/00* (2006.01)
*G06K 15/16* (2006.01)

(52) U.S. Cl.
CPC ............ *H04N 1/0061* (2013.01); *G06K 15/16* (2013.01); *H04N 1/00588* (2013.01); *H04N 1/00594* (2013.01); *H04N 2201/0081* (2013.01)

(58) Field of Classification Search
CPC ........... H04N 1/0061; H04N 1/00588; H04N 1/00594; G06K 15/16
USPC ................................. 358/496, 498, 401, 501
See application file for complete search history.

(56) References Cited

U.S. PATENT DOCUMENTS

| | | | | |
|---|---|---|---|---|
| 4,866,531 A * | 9/1989 | Kobori | ................. | H04N 1/0461 358/296 |
| 5,206,737 A * | 4/1993 | Sugiyama | ............ | H04N 1/0057 358/296 |
| 5,226,639 A * | 7/1993 | Kida | ....................... | B41J 23/025 271/109 |
| 5,854,696 A * | 12/1998 | Yun | ...................... | H04N 1/0461 271/10.04 |
| 5,862,446 A * | 1/1999 | Hashizume | .......... | H04N 1/0464 399/367 |
| 6,019,363 A * | 2/2000 | Ahn | ..................... | H04N 1/0402 271/10.05 |
| 6,948,871 B1 * | 9/2005 | Onishi | ............... | H04N 1/02427 347/218 |
| 7,123,386 B2 * | 10/2006 | Tanaka | ................. | H04N 1/1013 358/408 |
| 7,448,620 B2 * | 11/2008 | Ha | ........................... | B65H 5/06 271/258.01 |
| 7,466,461 B2 * | 12/2008 | Chen | .................... | H04N 1/1017 318/685 |
| 7,729,020 B2 * | 6/2010 | Chien | ................. | H04N 1/0402 358/400 |
| 7,869,105 B2 * | 1/2011 | Ikeda | ................. | H04N 1/00567 358/471 |
| 7,984,907 B2 * | 7/2011 | Chen | ....................... | B65H 5/06 271/273 |
| 8,328,179 B2 * | 12/2012 | Shimomura | ............. | B65H 5/26 271/10.04 |
| 8,730,532 B2 * | 5/2014 | Lee | .................... | H04N 1/00628 358/474 |
| 8,848,264 B2 * | 9/2014 | Mori | ................... | H04N 1/00013 271/10.11 |
| 2013/0329265 A1 * | 12/2013 | Miyamoto | ............. | H04N 1/121 358/496 |
| 2014/0092446 A1 * | 4/2014 | Shingai | ............. | H04N 1/00822 358/496 |

FOREIGN PATENT DOCUMENTS

JP 2011-066707 A 3/2011

* cited by examiner

*Primary Examiner* — Cheukfan Lee
(74) *Attorney, Agent, or Firm* — Muncy, Geissler, Olds & Lowe, P.C.

(57) ABSTRACT

An image process device includes a medium placing part, a sheet feeding part, a first carrying part arranged on a downstream side of the sheet feeding part in a medium carrying direction; a second carrying part arranged on a downstream side of the first carrying part; an imaging unit positioned between the first carrying part and the second carrying part; a driving part equipped with a rotation shaft and provides a driving force via the rotation shaft; a drive transmission member that rotates in correspondence with a rotation of the rotation shaft; a first drive transmission system that connects the drive transmission member with the sheet feeding part and transmits the driving force of the driving part to the sheet feeding part; and a second drive transmission system that is independent from the first drive transmission system, connects the drive transmission member with the first and second carrying parts and transmits the driving force of the driving part to the first and second carrying parts.

13 Claims, 6 Drawing Sheets

IMAGE PROCESS DEVICE

CROSS REFERENCE

The present application is related to, claims priority from and incorporates by reference Japanese Patent Application No. 2014-089311, filed on Apr. 23, 2014.

TECHNICAL FIELD

The present invention relates to an image process device such as an image reading device, an image forming apparatus, etc., and more specifically relates to a structure of a drive transmission system of a medium carrying mechanism of the image process device.

BACKGROUND

Conventionally, there are devices in which a medium loaded on a medium placing part is carried to read an image from the medium by a reading unit or form an image on a medium by an image forming unit (for example, see Japanese Unexamined Patent Application Publication No. 2011-66707 (Paragraph 4, FIG. 2).

However, there is a case in which it is desired to reduce the number of the drive source of the medium carrying mechanism as much as possible while reducing deterioration in quality due to image distortion, etc., to be generated when reading an image from a medium or forming an image on a medium, but it was difficult to achieve both demands.

Putting it other way, there is a trade off. When each pair of rollers for carrying a sheet is arranged with its own motor to drive, there is no influence between the pairs of rollers. Even if one pair of rollers starts or stopped, other pairs of rollers are able to carry the sheet without skewing. That is because no stress is conveyed to the other rollers. However, the structure increases the number of motors, resulting in high production cost. On the other hand, when all of the rollers are connected to a single motor to drive, the production cost can be maintained low. However, in such a structure, the pairs of rollers are mutually influenced. When one pair of rollers stops or starts, undesired load or stress is generated and might be conveyed to other rollers, causing unexpected movements (or not smooth movements) of the other rollers. In the case, the sheet carried with the rollers often skews.

In order to minimize the above trade off, the invention includes only a single driving part but two different drive transmissions system for feeding a medium. One drive transmission system is for feeding the medium from a medium placing part to a downstream. The other is for feeding the medium to an imaging unit where a developer image can be made on the medium. By separating the transmission system into two ways, each of the drive transmissions is independent, resulting in minimizing an influence caused by staring or stopping one of the drive transmission systems.

More specifically described, the invention relates to an image process device includes a medium placing part that places a medium, a sheet feeding part that feeds the medium from the medium placing part, a first carrying part that is arranged on a downstream side of the sheet feeding part in a medium carrying direction and that carries the medium fed from the sheet feeding part to the downstream side, a second carrying part that is arranged on a downstream side of the first carrying part in the medium carrying direction, and that carries the medium fed from the first carrying part to the downstream side, an imaging unit that is positioned between the first carrying part and the second carrying part and reads an image on the medium or form an image on the medium, to which the medium is carried from the first carrying part and from which the medium is carried to the second carrying part, a driving part that is equipped with a rotation shaft and provides a driving force via the rotation shaft, a drive transmission member that rotates in correspondence with a rotation of the rotation shaft, a first drive transmission system that connects the drive transmission member with the sheet feeding part and transmits the driving force of the driving part to the sheet feeding part; and a second drive transmission system that is independent from the first drive transmission system, connects the drive transmission member with the first and second carrying parts and transmits the driving force of the driving part to the first and second carrying parts. In the invention, the drive transmission system means any type of systems that are able to transmit the driving force to the sequential elements such as the sheet feeding part or the sheet carrying pair rollers. The transmission systems are configured with gears, a pair of pulley and belt, or combination of gear, pulley and belt. Not only mechanical transmission system but an electrical transmission system as well are available to realize the transmission function. Arranging an IC chip and a motor in the drive transmission system, the driving force can increase or decrease during the transmission. Also, using a wireless transmitter and a receiver, a part of the system can be wireless.

According to the present invention, even if load fluctuations occur in the first drive transmission system, since the load fluctuations barely affect the second drive transmission system, it becomes possible to stably carry a medium by the first and second carrying parts at all times.

PREFERRED EMBODIMENTS

Embodiment 1

Figure 1:
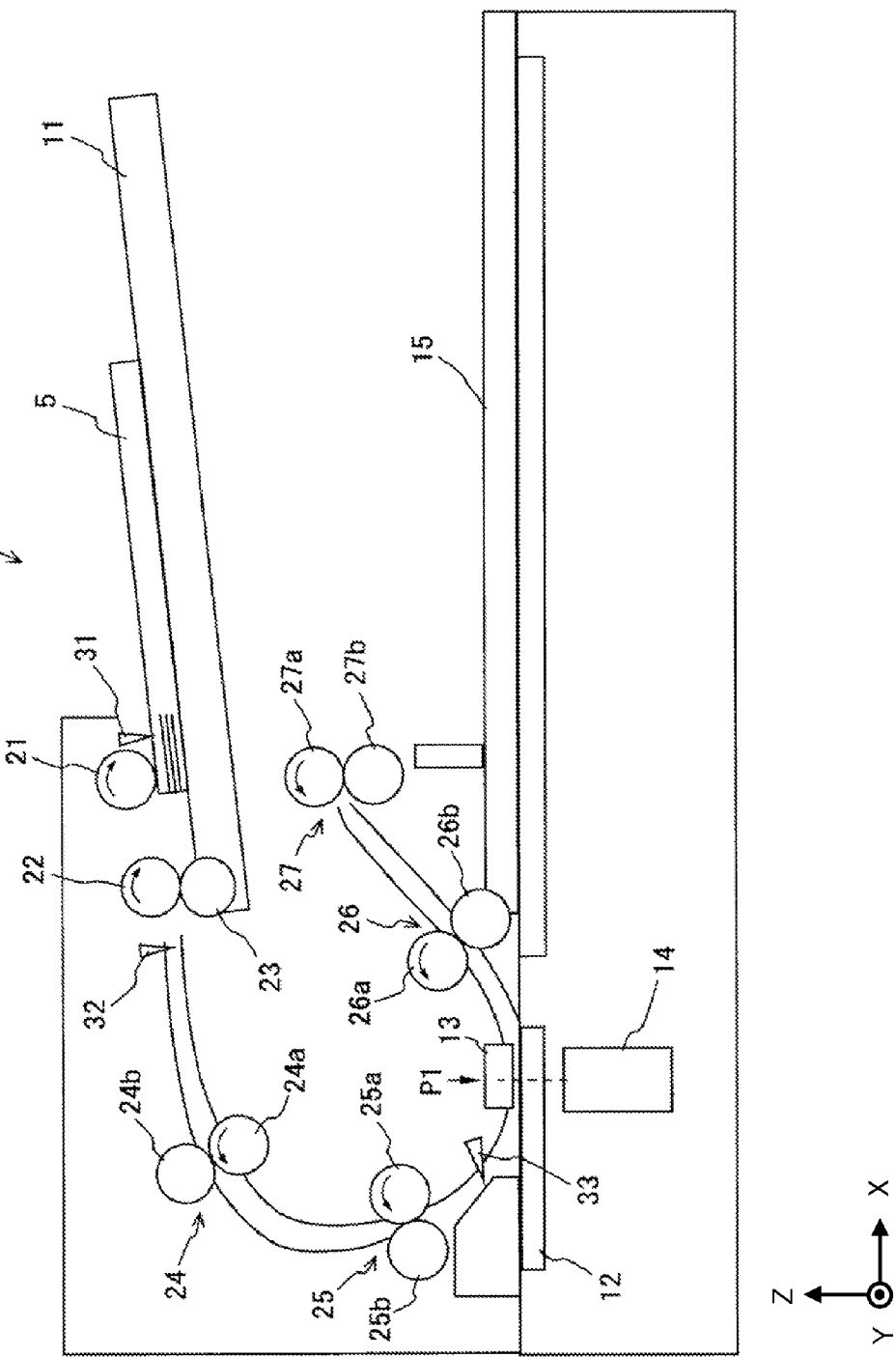
FIG. 1 is a schematic structural diagram for explaining a structure of main parts of an image reading device of Embodiment 1 according to the present invention.

FIG. 1 is a schematic structural diagram for explaining a structure of main parts of an image reading device 1 of Embodiment 1 of an image process device according to the present invention.

As shown in the figure, in the image reading device 1, a sheet platen 11, a permeable plate 12, a sheet pressing member 13, an image reading unit 14, an ejected manuscript platen 15, a pickup roller 21, a sheet feeding roller 22, a separation roller 23, a first carrying roller pair 24, a second carrying roller pair 25, a third carrying roller pair 26, an ejection roller pair 27, a first sensor 31, a second sensor 32, and a third sensor 33 are arranged.

The sheet platen 11 as a medium placing part is configured to load manuscript sheets 5 as mediums, and the pickup roller 21 is configured to send out the uppermost manuscript sheet of the manuscript sheets 5 loaded in a stacked manner on the sheet platen 11 toward a sheet carrying path on the downstream side. The sheet feeding roller 22 and the separation roller 23 arranged on the downstream side of the pickup roller 21 in the sheet carrying direction in a state in which they are in contact with each other with a predetermined pressure together carry the manuscript sheets 5 fed by the pickup roller 21 one by one to the downstream side along the sheet carrying path so that a plurality of sheets do not overlap. The pickup roller 21, the sheet feeding roller 22, and the separation roller 23 correspond to a sheet feeding part, and the pickup roller 21 and the sheet feeding roller 22 rotate in the arrow direction by receiving a driving force from a drive system which will be described later.

A first carrying roller pair 24 and a second carrying roller pair 25 as a first carrying part are arranged along a sheet carrying path on the downstream side of the sheet feeding roller 22 in the sheet carrying direction, and sequentially carry manuscript sheets 5 fed by the sheet feeding roller 22 and the separation roller 23 to the downstream side. The first carrying roller pair 24 is arranged in a state in which a drive roller 24a and a driven roller 24b are in contact with each other with a predetermined pressure, and the second carrying roller pair 25 is also arranged in a state in which a drive roller 25a and a driven roller 25b are in contact with each other with a predetermined pressure. These drive rollers 24a and 25a receive a driving force from a drive system which will be described later and thereby rotate in a rotation direction (arrow direction) to carry the manuscript sheet 5 in the sheet carrying direction.

A permeable plate 12 and a sheet pressing member 13 are arranged opposing each other via the sheet carrying path on the downstream side of the second carrying roller pair 25 in the sheet carrying direction, and an image reading unit 14 as and imaging unit is arranged on the opposite side of the sheet pressing member 13 via the permeable plate 12. The image reading unit 14 reads data of the passing manuscript sheet 5 at a reading position P1 when the manuscript sheet 5 passes between the permeable plate 12 and the sheet pressing member 13.

A third carrying roller pair 26 as a second carrying part and the ejection roller pair 27 as a third carrying part are arranged along the sheet carrying path on the downstream side of the reading position P1 in the sheet carrying direction, and the third carrying roller pair 26 carries the manuscript sheet 5 passed the reading position P1 to the downstream side, and the ejection roller pair 27 ejects the manuscript sheet 5 carried to the downstream side by the third carrying roller pair 26 onto the ejected manuscript platen 15.

The third carrying roller pair 26 is arranged in a state in which a drive roller 26a and a driven roller 26b are in contact with each other with a predetermined pressure, and the ejection roller pair 27 is also arranged in a state in which a drive roller 27a and a driven roller 27b are in contact with each other with a predetermined pressure. These drive rollers 26a and 27a receive a driving force from a drive system which will be described later and thereby rotate in a rotation direction (arrow direction) to carry the manuscript sheet 5 in the sheet carrying direction.

Figure 3:
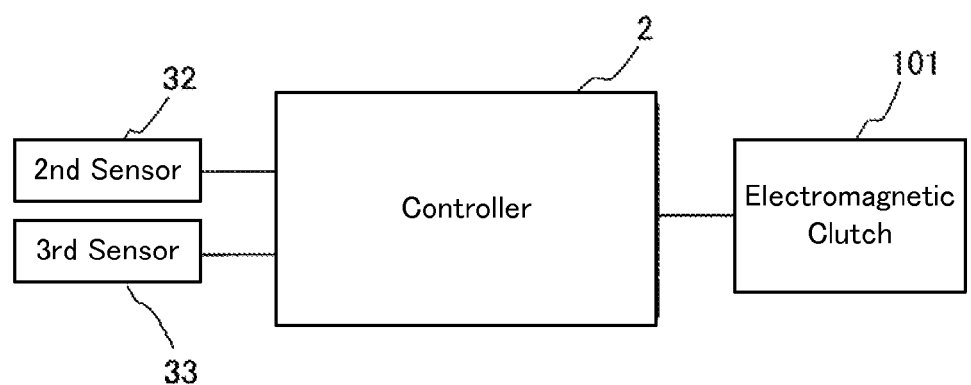
FIG. 3 is a block diagram showing a structure of main parts of a control system for performing an on-off control of an electromagnetic clutch.

The first sensor 31 detects whether there is a manuscript sheet 5 on the sheet platen 11, and a second sensor 32 arranged on the downstream side of the sheet feeding roller 22 and a third sensor 33 arranged on the upstream side of the reading position P1 detect the manuscript sheet 5 which is being carried and passed through, and transmits the respective detection information to a controller 2 (see FIG. 3).

Figure 2:
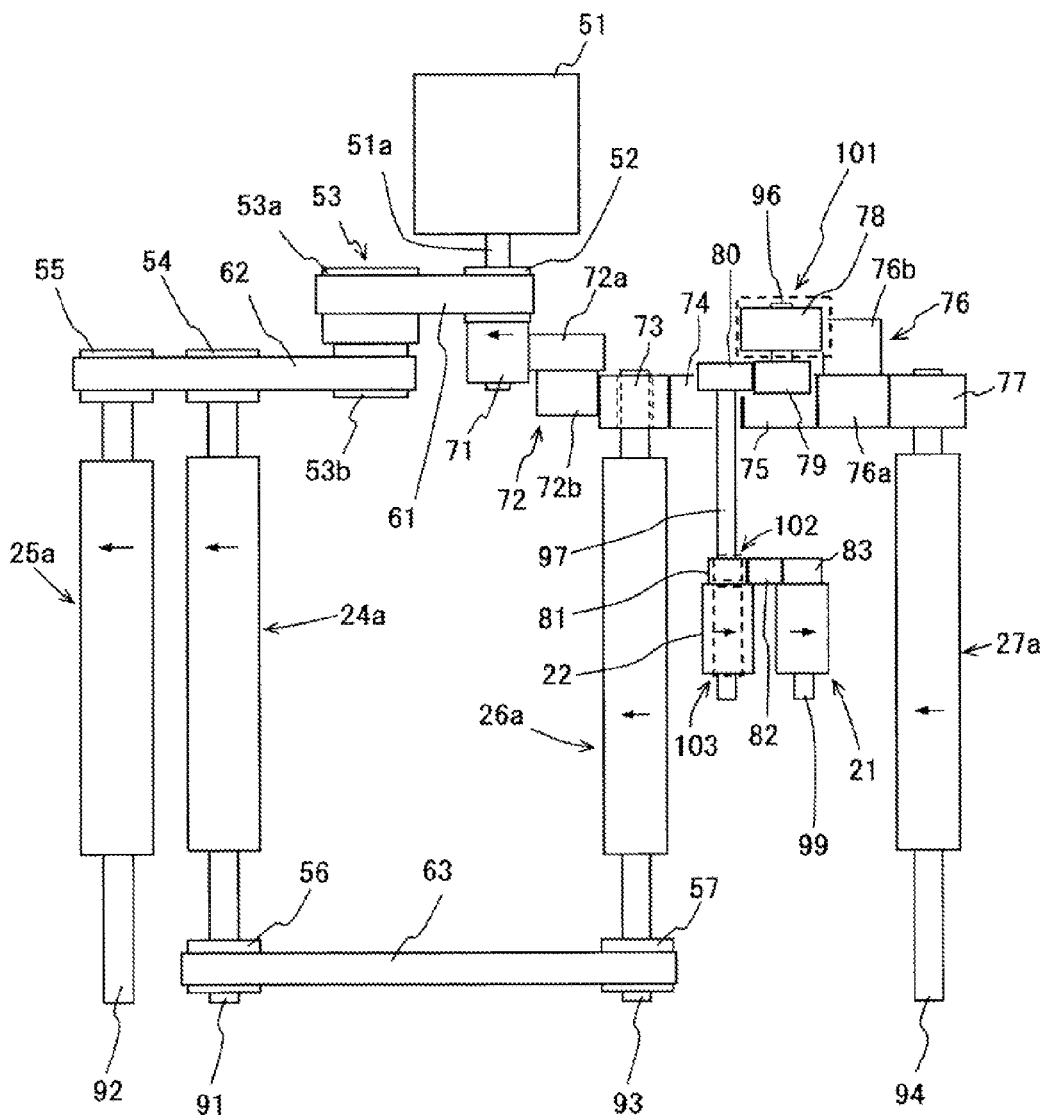
FIG. 2 is a plan view schematically showing a structure of main parts of a drive source and a drive transmission system for driving a pickup roller, a sheet feeding roller, first to third carrying roller pairs, and an ejection roller pair according to Embodiment 1.

FIG. 2 is a plan view schematically showing a structure of main parts of the drive source and the drive transmission system for driving the pickup roller 21, the sheet feeding roller 22, the first to third carrying roller pairs 24, 25, and 26, and the ejection roller pair 27.

As shown in the figure, a pulley 52 is coaxially fixed to a rotation shaft 51a as a shaft for a drive motor 51 as a driving part, and a toothed belt 61 is extended between a large-diameter pulley 53a of a reduction pulley 53 and the pulley 52. A pulley 54 is coaxially fixed to the rotation shaft 91 of the drive roller 24a of the first carrying roller pair 24, a pulley 55 is coaxially fixed to a rotation shaft 92 of a drive roller 25a of the second carrying roller pair 25, and a toothed belt 62 is extended between a pulley 54, a pulley 55, and a small-diameter pulley 53b of a reduction pulley 53.

A pulley 56 is coaxially fixed to the rotation shaft 91 of the drive roller 24a on the opposite side of the pulley 54, a pulley 57 is coaxially fixed to a rotation shaft 93 of the drive roller 26a of the third carrying roller pair 26, and a toothed belt 63 is extended between the pulley 56 and the pulley 57.

On the other hand, a gear 71 is coaxially fixed to a rotation shaft 51a as a drive shaft of the drive motor 51 in a similar manner as the pulley 52, and the gear 71 is meshed with a large-diameter gear 72a of the reduction gear 72, and a small-diameter gear 72b of the reduction gear 72 is meshed with the idler gear 73 rotatably held on the rotation shaft 93 of a drive roller 26a on the opposite side of the pulley 57. Here, the pulley 52 and the gear 71 correspond to a drive transmission member.

In addition, here, although an example in which the pulley 52 and the gear 71 as the drive transmission members are directly fixed to the rotation shaft 51a of the drive motor 51 is shown, it is not limited to that. For example, it can be configured such that the rotation shaft 51a of the drive motor 51 and a rotation shaft part to which a separately provided pulley 52 and a gear 71 are fixed are connected via a transmission means such as a belt, gears, etc.

A gear 77 is coaxially fixed to a rotation shaft 94 of a drive roller 27a of the ejection roller pair 27. Between the idler gear 73 and the gear 77, an idler gear 74 meshed with the idler gear 73, an idler gear 75 meshed with the idler gear 74, and a large-diameter gear 76a of a two-speed gear 76 meshed with the idler gear 75 are arranged in a row, and the large-diameter gear 76a and the gear 77 are meshed with each other. A small-diameter gear 76b of the two-speed gear 76 is meshed with a clutch gear 78 of an electromagnetic clutch 101.

Here, the electromagnetic clutch 101 includes the clutch gear 78 and a shaft 96, and is configured so that the clutch gear 78 and the shaft 96 contact or separate according to an on-state or an off-state. That is, when electric current is being supplied, it becomes an on-state, so that the shaft 96 and the clutch gear 78 integrally rotate, while when electric current is not supplied, it becomes an off-state, so that the clutch gear 78 becomes free with respect to the shaft 96.

A gear 79 coaxially fixed to the shaft 96 of the electromagnetic clutch 101 is meshed with a gear 80 coaxially fixed to a rotation shaft 97. On the rotation shaft 97, a gear 81 is coaxially arranged via a one-way clutch 102, and further, the sheet feeding roller 22 is coaxially arranged via a one-way clutch 103. To a rotation shaft 99 of the pickup roller 21, a gear 83 is coaxially fixed. The gear 83 is meshed with the gear 81 via an idler gear 82.

Here, the reduction gear 72, the idler gears 73, 74, and 75, the two-speed gear 76, the clutch gear 78, the gears 79 and 80, and the one-way clutches 102 and 103 correspond to the first drive transmission system, and the toothed belts 61 and 62, the reduction pulley 53, and the pulleys 54 to 57 correspond to the second drive transmission system.

In the aforementioned structure, when the drive motor 51 rotates in the predetermined direction, which is the arrow direction (counterclockwise direction) here, the drive rollers 24a, 25a, 26a and 27a rotate in the same direction, and further, when the electromagnetic clutch 101 is in an on-state, the pickup roller 21 and the sheet feeding roller 22 rotate in the opposite direction (clockwise direction). At this time, as shown in FIG. 1, each of the rollers is configured so as to rotate together in the direction of carrying the manuscript sheet 5 to the downstream side of the medium carrying direction.

Further, the one-way clutches 102 and 103 operate so that the rotation shaft 97, the gear 81, and the sheet feeding roller 22 integrally rotate in the same direction only when the drive motor 51 rotates in the arrow direction (counterclockwise direction). Therefore, even when the electromagnetic clutch 101 is in an off-state and the rotation shaft 97 is stopped, the pickup roller 21 and the sheet feeding roller 22 are configured so as to be able to rotate individually in the same direction.

FIG. 3 is a block diagram showing a structure of main parts of a control system for on-off control of the electromagnetic clutch 101.

As shown in the figure, the second sensor 32 and the third sensor 33 detect a manuscript sheet 5 which is being carried and passed, and transmit the respective detection information to the controller 2, and based on these manuscript detection information, the controller 2 controls the supply of electric current to the electromagnetic clutch 101 at the timing which will be mentioned later. Hereinafter, there may be a case in which the supplying of electric current to the electromagnetic clutch 101 is referred to as turning on the electromagnetic clutch 101 and stopping the supply of electric current to the electromagnetic clutch 101 is referred to as turning off the electromagnetic clutch 101.

In the aforementioned structure, the image reading operations by the image reading device 1 will be explained below.

In FIG. 1, in the image reading device 1, when the manuscript sheets 5 are stacked on the sheet platen 11, this is recognized by the first sensor 31 and based on a reading start instruction from a reading start switch not illustrated or from an external device such as a connected personal computer, the reading operation is initiated. With this, the drive motor 51 starts rotating in a predetermined direction (here, the counterclockwise direction, which is the arrow direction) shown in FIG. 2 and the controller 2 turns the electromagnetic clutch 101 into an on state.

At this time, the pickup roller 21 and the sheet feeding roller 22 receive a driving force transmitted by the first drive transmission system including the gear 71 fixed to the rotation shaft 51a of the drive motor 51, the reduction gear 72, the idler gears 73 to 75, the two-speed gear 76, the electromagnetic clutch 101, the gears 79 and 80, and the one-way clutches 102 and 103, and thereby rotate in the arrow direction (clockwise direction). Further, the drive roller 27a of the ejection roller pair 27 also integrally rotates with the gear 77 meshed with the two-speed gear 76 in the arrow direction (counterclockwise direction).

On the other hand, the drive roller 24a of the first carrying roller pair 24 and the drive roller 25a of the second carrying roller pair 25 receive a driving force transmitted by the second drive transmission system which is a separate system separated from the first drive transmission system and includes the pulley 52 fixed to the rotation shaft 51a of the drive motor 51, the toothed belt 61, the reduction pulley 53, and the toothed belt 62, and thereby rotate in the arrow direction (counterclockwise direction). Further, the drive roller 26a of the third carrying roller pair 26 receives a driving force transmitted via the toothed belt 63 and thereby rotates in the arrow direction (counterclockwise direction).

The uppermost manuscript sheet 5 is fed between the sheet feeding roller 22 and the separation roller 23 by the rotating pickup roller 21. The separation roller 23 rotates while contacting the sheet feeding roller 22, but is configured to generate a predetermined rotational load. Therefore, when a plurality of manuscript sheets is about to enter between the separation roller 23 and the sheet feeding roller 22, the entering of the plurality of manuscript sheets is prevented by separating them to allow only one manuscript sheet to pass through by the sheet feeding roller 22.

The one manuscript sheet 5 carried to the downstream side by the sheet feeding roller 22 is further carried to the downstream side by the first carrying roller pair 24 and the second carrying roller pair 25, and after the leading edge passes under the third sensor 33, it is further carried between the permeable plate 12 and the sheet pressing member 13. The controller 2 turns off the electromagnetic clutch 101 to thereby cut off the transmission of the rotation force to the pickup roller 21 and the sheet feeding roller 22 at the timing after a predetermined time T1 has passed after the third sensor 33 detects the leading edge of the passing manuscript sheet 5 but the trailing edge of the same manuscript sheet 5 is still being carried by the pickup roller 21.

Thereafter, the pickup roller 21 and the sheet feeding roller 22 rotate in the same direction accompanying the carrying of the manuscript sheet 5 by the first carrying roller pair 24, etc., to allow the carrying by the operation of the one-way clutch 102, and respectively stop the rotations at a stage that the trailing edge of the manuscript sheet 5 passes through.

The leading edge of the manuscript sheet 5 reaches the manuscript reading position P1 after a predetermined time after passing the third sensor 33, and the information of the manuscript sheet 5 is sequentially read by the image reading unit 14. The manuscript sheet 5 at this time is read by the image reading unit 14 while being regulated by the sheet pressing member 13 so as to not separate from the permeable plate 12 beyond a certain distance. The manuscript sheet 5 passed the reading position P1 is further carried to the downstream side by the third carrying roller pair 26 and the ejection roller pair 27 and ejected onto the ejected manuscript platen 15.

The controller 2 turns on the electromagnetic clutch 101 again after a predetermined time T2 has passed after detecting the trailing edge of the preceding manuscript sheet 5 whose information is to be read in the aforementioned manner by the second sensor 32. With this, the pickup roller 21 and the sheet feeding roller 22 again receive a driving force and rotate in the arrow direction (clockwise direction), and the uppermost next manuscript sheet 5 is fed between the sheet feeding roller 22 and the separation roller 23 by the rotating pickup roller 21. The subsequent reading operation is the same as the case of the aforementioned preceding manuscript sheet 5.

Next, the effects of turning on and off the electromagnetic clutch 101 to the sheet reading operation will be examined.

As described above, when the electromagnetic clutch 101 is turned on to feed the next manuscript sheet 5, synchronizing with the trailing edge of the preceding manuscript sheet 5 passing the second sensor 32, the rotational load of the pickup roller 21, the sheet feeding roller 22, and the separation roller 23 is transmitted to the driving part which is more to the upstream side of the gear 80 in the drive transmission system shown in FIG. 2.

When the electromagnetic clutch 101 is turned on to feed the next manuscript sheet 5, since the preceding manuscript sheet 5 is in the middle of being read by the image reading unit 14, in a case in which the carrying speed of the second carrying roller pair 25 and the third carrying roller pair 26 before and beyond the reading position P1 is temporarily reduced by the rotational load at this time, the read image is stretched, causing image distortion.

In a condition in which the rotation of the drive motor 51 is controlled to be constant regardless of the rotational load, the carrying speeds of the second carrying roller pair 25 and the third carrying roller pair 26 are temporarily reduced by the aforementioned rotational load in a case in which a driving member (for example, belt, gears, etc.) on the upstream of the second carrying roller pair 25 and the third carrying roller pair 26 in the drive transmission system slightly deforms from the impact of the rotational load.

Further, as described above, when the electromagnetic clutch 101 is turned off in synchronization with the passing of the leading edge of the manuscript sheet 5 under the third sensor 33, in a case in which the reading of the preceding manuscript sheet 5 has started, when the rotational load is lost, which in turn momentarily increases the carrying speeds of the second carrying roller pair 25 and the third carrying roller pair 26 before and beyond the reading position P1. This results in shrinkage of the read image, causing image distortion.

In a condition in which the rotation of the drive motor 51 is controlled to be constant regardless of the rotational load, the carrying speeds of the second carrying roller pair 25 and the third carrying roller pair 26 are momentarily increased by the aforementioned lost of the rotational load in a case in which the aforementioned slight deformation of the driving member (for example, belt, gears, etc.) on the upstream of the second carrying roller pair 25 and the third carrying roller pair 26 in the drive transmission system is reduced due to the lost of the rotational load.

However, in the structure of this embodiment, the second drive transmission system configured to transmit a rotary driving force from the drive motor 51 to the first to third carrying roller pairs 24, 25, and 26 and the first drive transmission system configured to transmit a rotation force to the pickup roller 21 and the sheet feeding roller 22 are separate systems separated from the rotation shaft 51$a$ of the drive motor 51. Therefore, the effects (speed fluctuation) of the rotational load and the lost of the rotational load occurred in the first drive transmission system will not be transmitted to the second drive transmission system via the rotation shaft 51$a$, which is the rotation shaft of the drive motor 51 in which the rotation is controlled to be constant, made of metal, and therefore will not twist by the loads of the pickup roller 21, the sheet feeding roller 22 and the separation roller 23.

Since the ejection roller pair 27 belongs to the first drive transmission system configured to transmit a rotation force to the pickup roller 21 and the sheet feeding roller 22, a momentary speed fluctuation may occur by the effect of the rotational loads of the pickup roller 21, the sheet feeding roller 22, and the separation roller 23. However, since the manuscript sheet 5 is sandwiched and carried by the third carrying roller pair 26, the reading position P1 positioned on the upstream side is not affected.

Rather, the ejection roller pair 27, due to the inertia force acting to maintain the rotation constant, functions to control the rotational load fluctuations caused by the sheet feeding roller 22 and the separation roller 23 when the fluctuations occur.

Next, a modified example of the embodiment will be explained.

Figure 4:
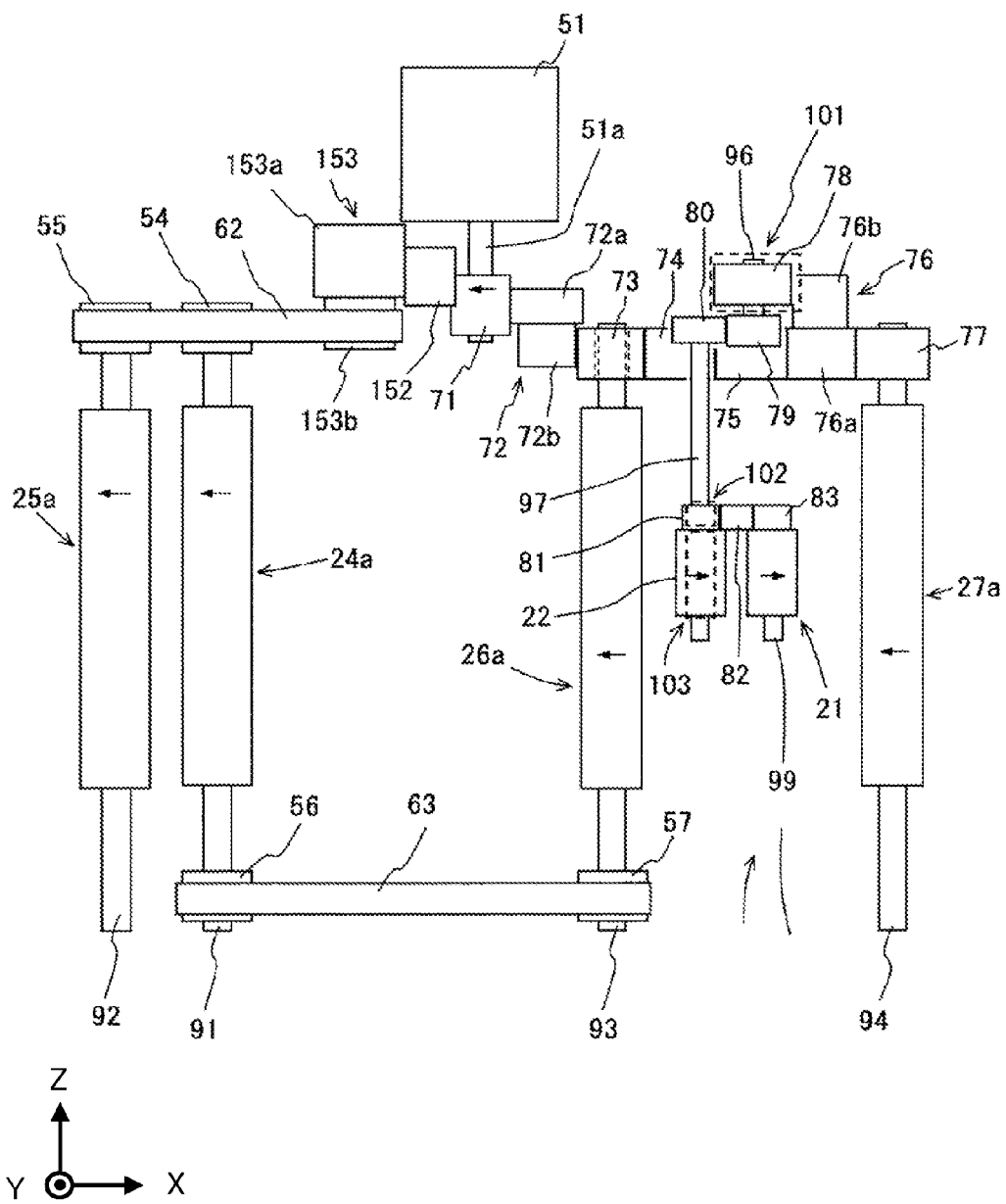
FIG. 4 is a plan view schematically showing a structure of main parts of the drive source and the drive transmission system for driving the pickup roller, the sheet feeding roller, the first to third carrying roller pairs, and the ejection roller pair according to a modified example of Embodiment 1.

FIG. 4 is a modified example of a plan view schematically showing the structure of main parts of the drive source and the drive transmission system for driving the pickup roller 21, the sheet feeding roller 22, the first to third carrying roller pairs 24, 25, and 26, and the ejection roller pair 27, in which an idler gear 152 is employed instead of the toothed belt 61.

In this modified example, the pulley 52 and the toothed belt 61 shown in FIG. 2 are removed, and an idler gear 152 meshed with a large-diameter gear 153$a$ corresponding to the large-diameter pulley 53$a$ of the reduction pulley 53 (FIG. 2) and the gear 71 fixed to the rotation shaft 51$a$ of the drive motor 51 is added. The other structures are the same as the drive transmission system of FIG. 2, including that the toothed belt 62 is put on the small-diameter pulley 153$b$ of the reduction pulley 153 and the large-diameter gear 72$a$ of the reduction gear 72 is meshed with the gear 71.

Here, since the second drive transmission system configured to transmit a rotary driving force from the drive motor 51 to the first to third carrying roller pairs 24, 25, and 26, and the first drive transmission system configured to transmit a rotation force to the pickup roller 21 and the sheet feeding roller 22 are separate systems separated from the gear 71 as a drive transmission member fixed to the rotation shaft 51$a$ of the drive motor 51. Therefore, in the same manner as in the aforementioned embodiment, the effects of the rotational load and the lost of the rotational load occurred in the first drive transmission system (rotation fluctuation) will not be transmitted to the second drive transmission system. Accordingly, the effect to the read image can be reduced.

Further, in this embodiment, although the toothed belt is used to transmit the driving force in the second drive transmission system, even when the effects (rotation fluctuation) of the rotational load and the lost in the rotational load occurred in the first drive transmission system is thereby slightly transmitted to the second drive transmission system, the effects can be absorbed by the toothed belt.

As described above, according to the image reading device 1 of this embodiment, since the rotation speed changes due to the rotational load fluctuations occurred by turning on and off the electromagnetic clutch 101 do not affect the drive transmission system configured to transmit the rotation driving force to the second and third carrying roller pairs 25 and 26 positioned before and beyond the reading position P1 in the carrying direction, it is possible to always provide a high quality read image that is not stretched or shrunk.

Embodiment 2

Figure 5:
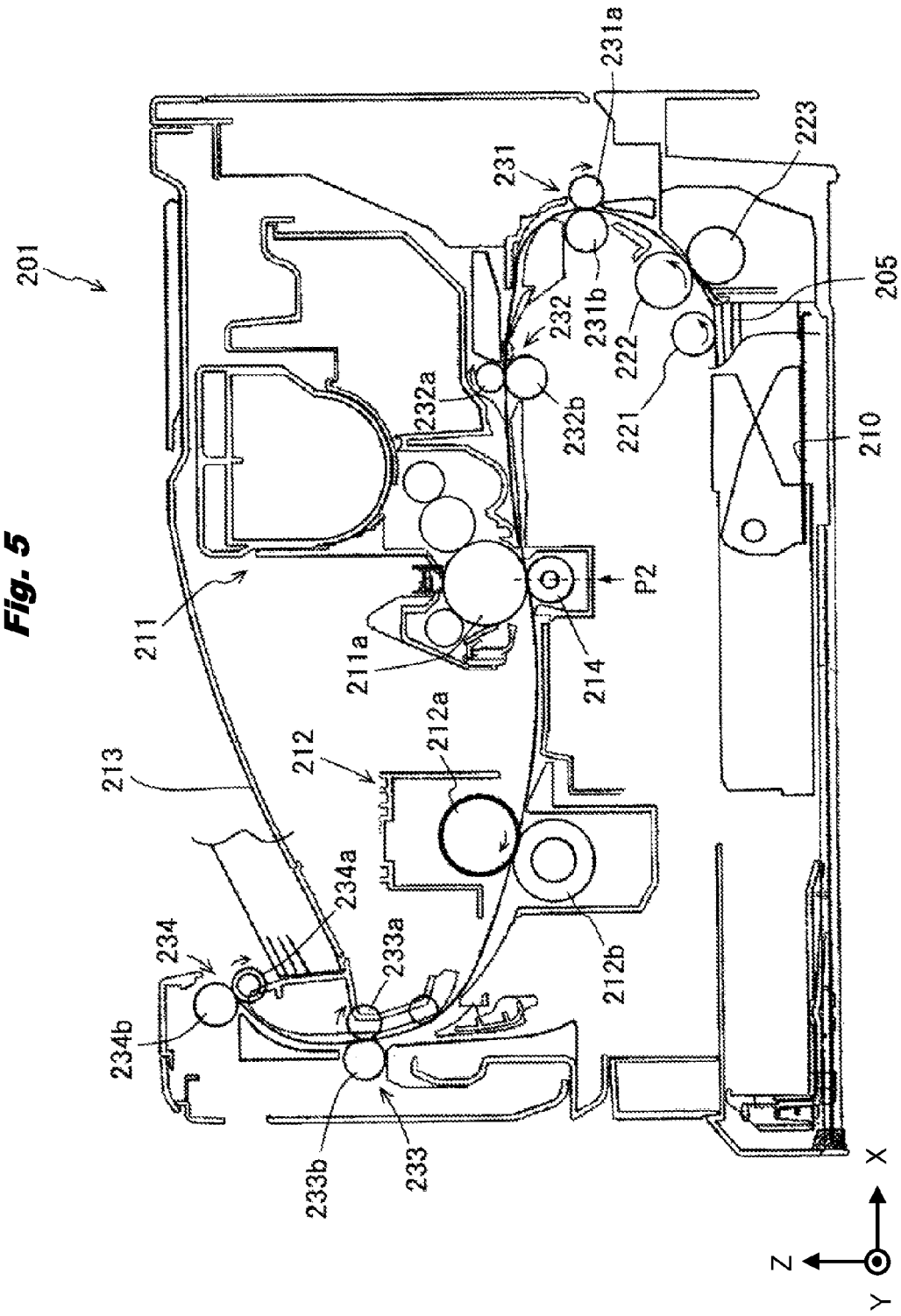
FIG. 5 is a schematic structural diagram for explaining a structure of main parts of an image forming apparatus of Embodiment 2 according to the present invention.

FIG. 5 is a schematic structural diagram for explaining the structure of main parts of an image forming apparatus 201 of Embodiment 2 of an image process device according to the present invention.

As shown in the figure, the image forming apparatus 201 is provided with a sheet cassette 210, an image forming unit 211, a fuser unit 212, a stacker 213, a transfer roller 214, a pickup roller 221, a sheet feeding roller 222, a separation roller 223, a carrying roller pair 231, a registration roller pair 232, a carrying roller pair 233, and an ejection roller pair 234.

The sheet cassette 210 as a medium placing part is configured to load recording sheets 205 as mediums, and the pickup roller 221 is configured to feed the uppermost recording sheet of the recording sheets 205 placed one on the other in the sheet cassette 210 to a sheet carrying path on the downstream side. The sheet feeding roller 222 and the separation roller 223 arranged in a state in which they are in contact with each other with a predetermined pressure on the downstream side of the pickup roller 221 in the sheet carrying direction work together to carry the recording sheets 205 fed by the pickup roller 221 one by one along the sheet carrying path to the downstream side so that a plurality of sheets do not overlap. Further, the pickup roller 221, the sheet feeding roller 222, and the separation roller 223 correspond to the sheet feeding part and the pickup roller 221 and the sheet feeding roller 222 receive a driving force from a drive system which will be explained later and rotate in the arrow direction.

The carrying roller pair 231 and the registration roller pair 232 as the first carrying part are arranged along the sheet carrying path on the downstream side of the sheet feeding roller 222 in the sheet carrying direction, and sequentially carry the recording sheets 205 fed by the sheet feeding roller 222 and the separation roller 223 to the downstream side. The carrying roller pair 231 is arranged in a state in which the drive roller 231*a* and the driven roller 231*b* are in contact with each other with a predetermined pressure, and the registration roller pair 232 is also arranged in a state in which the drive roller 232*a* and the driven roller 232*b* are in contact with each other with a predetermined pressure. Further, these drive rollers 231*a* and 232*a* receive a driving force from a drive system which will be explained later and rotate in the arrow direction.

Further, the registration roller pair 232 corrects the skew of the recording sheet 205 to be carried, and then sends it to the image forming part as an imaging unit including an image forming unit 211 and a transfer roller 214 arranged on the downstream side thereof.

In the image forming part, a toner image formed on a photosensitive drum 211*a* based on print data is transferred onto the recording sheet 205 carried from the registration roller pair 232 by the transfer roller 214, and the transferred recording sheet 205 is carried to the fuser unit 212.

In the fuser unit 212, the toner image transferred to the recording sheet 205 to be carried is fused by applying heat and pressure treatment using a roller pair as a second carrying part including a heated heat application roller 212*a* and a pressure application roller 212*b* which is contacted and pressed against the heat application roller 212*a*, and the sheet is ejected to the downstream side in the carrying direction. The carrying roller pair 233 carries the fused recording sheet 205 fed from the fuser unit 212 to the ejection roller pair 234, and the ejection roller pair 234 ejects the print-processed recording sheet 205 onto the stacker 213. Therefore, the recording sheets 205 sequentially printed by the aforementioned process are stacked one on the other on the stacker 213.

The carrying roller pair 233 is arranged in a state in which the drive roller 233*a* and the driven roller 233*b* are in contact with each other with a predetermined pressure, and the ejection roller pair 234 is also arranged in a state in which the drive roller 234*a* and the driven roller 234*b* are in contact with each other with a predetermined pressure. Further, these drive rollers 233*a* and 234*a* receive a driving force from a drive system which will be explained later and rotate in the arrow direction.

In the structure shown in the figure, with respect to the structure of the transmission path of the drive source and the drive transmission system configured to drive the pickup roller 21, the sheet feeding roller 22, the first to third carrying roller pairs 24, 25, 26, and the ejection roller pair 27 shown in the aforementioned FIG. 2 of Embodiment 1, it is structured such that each of the rollers correspond to the pickup roller 221, the sheet feeding roller 222, the carrying roller pair 231, the heat application roller 212*a*, the registration roller pair 232, and the carrying roller pair 233, respectively, and the ejection roller pair 234 and its transmission path are further added.

The gear 85 is coaxially fixed to the rotation shaft 98 of the drive roller 234*a* of the added ejection roller pair 234 and meshed with a gear 77 via an idler roller 84.

Since the structure of the drive transmission path excluding the added drive roller 234*a* is the same as the structure of the aforementioned FIG. 2, it will not be explained in detail here. However, in the aforementioned structure, when the drive motor 51 rotates in the predetermined direction, which is the arrow direction (counterclockwise direction) here, the drive rollers 231*a*, 232*a*, 233*a*, 234*a*, and the heat application roller 212*a* rotate in the same direction, and further, when the electromagnetic clutch 101 is in an on state, the pickup roller 221 and the sheet feeding roller 222 rotate in the opposite direction (clockwise direction). At this time, as shown in FIG. 5, each roller is configured to rotate together in the direction to carry a recording sheet 205 to the downstream side.

Also in the image forming apparatus 201 of this embodiment, it is assumed that the electromagnetic clutch 101 is turned on and off to drive the rotation of the pickup roller 221, the sheet feeding roller 222, and the separation roller 223 while the toner image formed on the photosensitive drum 211*a* is being transferred onto the recording sheet 205 using the transfer roller 214 at the transfer position P2.

Due to the effects at that time, when there is a change in the carrying speed of the registration roller pair 232 and a roller pair of the heat application roller 212*a* and the pressure application roller 212*b* the fuser unit 212, which sandwich and carry the recording sheet 205 before and after transfer position P2 in the medium carrying direction, a distortion occurs in the toner images to be transferred.

Figure 6:
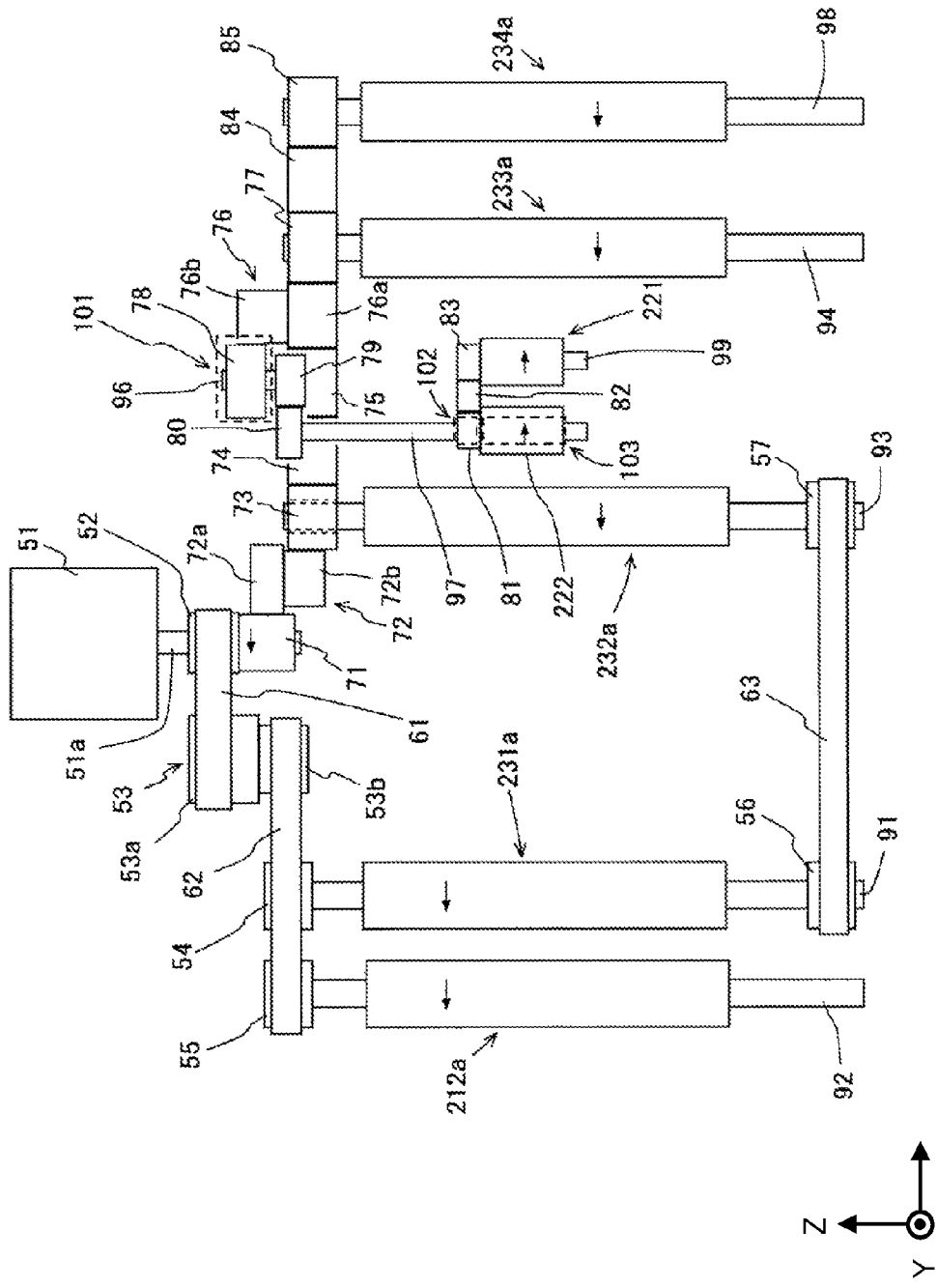
FIG. 6 is a plan view schematically showing main parts of a structure of a transmission path of a drive source and a drive transmission system for driving a pickup roller, a sheet feeding roller, a carrying roller pair, a registration roller pair, a carrying roller pair, an ejection roller pair, and a heat application roller according to Embodiment 2.

However, in the structure of this embodiment, as shown in FIG. 6, the second drive transmission system configured to transmit a rotary driving force from the drive motor 51 to the drive roller 231*a* of the carrying roller pair 231, the drive roller 232*a* of the registration roller pair 232, and the heat application roller 212*a*, and the first drive transmission system configured to transmit a rotation force to the pickup roller 221 and the sheet feeding roller 222 are separate systems separated from the rotation shaft 51*a* of the drive motor 51. Therefore, the effects (speed fluctuation) of the rotational load and the lost of the rotational load occurred in the first drive transmission system are not transmitted to the second drive transmission system via the rotation shaft 51*a*, which is the rotation shaft of the drive motor 51 in which the rotation is controlled to be constant, made of metal, and therefore will not twist by the loads of the pickup roller 221, the sheet feeding roller 222 and the separation roller 223.

Since the carrying roller pair 233 and the ejection roller pair 234 belong to the first drive transmission system configured to transmit a rotation force to the pickup roller 221 and the sheet feeding roller 222, a momentary speed fluctuation may occur due to the effects of the rotational load of the pickup roller 221, the sheet feeding roller 222, and the separation roller 223. However, since the recording sheet 205 is sandwiched and carried by a roller pair of the heat application roller 212a and the pressure application roller 212b, the transfer position P2 positioned on the upstream side will not be affected.

Further, in this embodiment, a driving force is transmitted from the toothed belt 63 to the rotation shaft 93 of the drive roller 232a of the registration roller pair 232 via the pulley 57. However, it can be configured so that, for example, an electromagnetic clutch is provided between the pulley 57 and the rotation shaft 93 so as to control the transmission of the driving force intermittently as needed.

As described above, according to the image forming apparatus 201 of this embodiment, since the effects of the rotation speed fluctuation caused by the rotational load fluctuation occurred from turning on and off the electromagnetic clutch 101 do not influence the respective sheet carrying speeds of the registration roller pair 232 and a roller pair of the heat application roller 212a and the pressure application roller 212b positioned before and beyond the transfer position P2 in the carrying direction, it is possible to always provide high quality print images that are not stretched or shrunk.

The explanation of the aforementioned embodiments are directed to a monochromatic electrophotographic printer as an example of an image reading device and an image forming apparatus, but the present invention can be similarly applied to an image process device such as an MFP, a facsimile, and a photocopier, including a color electrophotographic printer.

Table 1 below shows key elements of the invention and actual structures, which correspond thereto, recited in the drawings.

TABLE 1

| Key Elements in Claims | Embodiments with Numeral |
| --- | --- |
| First Carrying Part | Second Carrying Roller Pair 25 |
| Second Carrying Part | Third Carrying Roller Pair 26 |
| Third Carrying Part | Ejection Roller Pair 27 |
| Drive Transmission Member | |
| First Drive Transmission Member . . . | Gear 71 |
| Second Drive Transmission Member . . . | Pulley 52 (FIGS. 2, 6) Pulley 152 (FIG. 4) |
| First Drive Transmission System | 1st Embodiment (FIG. 2) (71)-72~76-78~80-97-81 ┬ (22) └ 82-83-(21) |
| | 3rd Embodiment (FIG. 6) (71)-72~76 ┬ 78~80-97-81 ┬ (222) │ └ 82-83-(221) └ 84 ┬ 77-(233) └ 85-(234) |

TABLE 1-continued

| Key Elements in Claims | Embodiments with Numeral |
| --- | --- |
| Second Drive Transmission System | 1st Embodiment (FIG. 2) (52)-61-53-62 ┬ 55-(25) └ 54-91-63-(26) |
| | 2nd Embodiment (FIG. 4) (152)-153-62 ┬ 55-(25) └ 54-91-63-(26) |

What is claimed is:

1. An image process device, comprising:
a medium placing part that places a medium;
a sheet feeding part that feeds the medium from the medium placing part;
a first carrying part that is arranged on a downstream side of the sheet feeding part in a medium carrying direction and that carries the medium fed from the sheet feeding part to the downstream side;
a second carrying part that is arranged on a downstream side of the first carrying part in the medium carrying direction, and that carries the medium fed from the first carrying part to the downstream side;
an imaging unit that is positioned between the first carrying part and the second carrying part and reads an image on the medium or form an image on the medium, to which the medium is carried from the first carrying part and from which the medium is carried to the second carrying part;
a driving part that is equipped with a rotation shaft and provides a driving force via the rotation shaft;
a drive transmission member that rotates in correspondence with a rotation of the rotation shaft;
a first drive transmission system that connects the drive transmission member with the sheet feeding part and transmits the driving force of the driving part to the sheet feeding part; and
a second drive transmission system that is independent from the first drive transmission system, connects the drive transmission member with the first and second carrying parts and transmits the driving force of the driving part to the first and second carrying parts.

2. The image process device according to claim 1, wherein
the drive transmission member is coaxially arranged on the rotation shaft of the driving part.

3. The image process device according to claim 1, wherein
the drive transmission member is arranged at off center from the rotation shaft of the driving part.

4. The image process device according to claim 1, wherein
the drive transmission member is configured with a first drive transmission member and a second drive transmission member, and
the first drive transmission member is connected to the first drive transmission system so that the driving force to first drive transmission system is transmitted via the first drive transmission member, and
the second drive transmission member is connected to the second drive transmission system so that the driving force to the second drive transmission system is transmitted via the second drive transmission member.

5. The image process device according to claim 4, wherein
at least one of the first drive transmission system and the second drive transmission system is coaxially arranged on the rotation shaft of the driving part.

6. The image process device according to claim 1, further comprising
a third carrying part that is arranged on a downstream side of the second carrying part in the medium carrying direction, wherein,
the first drive transmission system that connects the drive transmission member with the third carrying part so that the driving force of the driving part is transmitted to the third carrying part via the first drive transmission system.

7. The image process device according to claim 1, wherein
the first drive transmission system is configured with gears to transmit the driving force, and
the second drive transmission system is configured with at least a pair of a belt and a pulley to transmit the driving force.

8. The image process device according to claim 1, further comprising:
a clutch that is arranged in the first drive transmission system, and configured to cut or connect the transmission of the driving force from the drive transmission member to the sheet feeding part.

9. The image process device according to claim 8, wherein
the second drive transmission system is configured with at least a pair of a belt and a pulley to transmit the driving force so that the belt absorbs a stress conveyed from the first drive transmission system, the stress generated due to the cut or connect action by the clutch.

10. The image process device according to claim 8, wherein
the sheet feeding part includes
a pickup roller which rotates by receiving the driving force,
a sheet feeding roller which rotates by receiving the driving force, and
a separation roller which is in pressure-contact with the sheet feeding roller.

11. The image process device according to claim 10, wherein
the pickup roller and the sheet feeding roller separately receive the driving force via a one-way clutch.

12. The image process device according to claim 1, wherein
the first carrying part and the second carrying part are respectively configured with a drive roller which rotates by receiving the driving force and a driven roller which rotates in pressure-contact with the drive roller.

13. The image process device according to claim 12, wherein
the drive roller of the second carrying part is a heat application roller of a fuser unit, and
the driven roller of the second carrying part is a pressure application roller of the fuser unit.

\* \* \* \* \*